DRIVER CIRCUITRY FOR HIGH SPEED COUNTERS AND THE LIKE

Filed June 27, 1966

INVENTOR
TAT C. LAM
BY Harold R. Pillow
ATTORNEY

INVENTOR
TAT C. LAM
BY Harold R. Tullar
ATTORNEY 3,422,288

DRIVER CIRCUITRY FOR HIGH SPEED COUNTERS AND THE LIKE

Tat C. Lam, St. Louis, Mo., assignor to Monsanto Company, St. Louis, Mo., a corporation of Delaware Filed June 27, 1966, Ser. No. 560,546
U.S. Cl. 307—286 5 Claims
Int. Cl. H03k 3/315

ABSTRACT OF THE DISCLOSURE

A tunnel diode is connected to a signal source and triggered thereby to generate pulses having sharp leading and trailing edges. The pulses are applied to a differentiator circuit including a capacitor connected to the emitter electrode of a common base transistor. In this manner sharp, fast spikes are provided at the collector electrode of the common base transistor.

The present invention relates generally to pulse generating circuits, and more particularly to improvements in pulse driver circuits capable of providing sharp, fast pulses or spikes for high speed counters and the like, wherein the counting rates of such counters are greatly enhanced.

In certain frequency, time-interval, and like measurement applications, high speed counters are often employed to provide various counting and dividing functions. Among the problems involved in attempting to substantially extend the range of such counters is that of providing a plurality of successively occurring sharp, fast pulses whose time durations and voltage amplitudes are on the order of a few nanoseconds and tenths of a volt respectively. Heretofore, the well known resistor-capacitor (RC) type differentiating circuits have been used in an attempt to deliver counting pulses to high speed counters. However, where it is desired to operate counters above say 100 mc., such RC differentiating circuits tend to respond too slowly and do not provide sufficient isolation to prevent transients at the counters from effecting the operation of the pulse generating circuitry. Furthermore, the RC type differentiating circuits require some means to shape the pulses and limit those of opposite polarity from those intended to drive the counter.

The general purpose of this invention is to provide pulse-generating driver circuitry for high speed electronic circuits which embraces the advantages of similarly employed circuits, and yet does not possess the foredescribed limitations. To attain this, the present invention utilizes a unique combination of a tunnel diode and differentiating circuit including an active element which provides a relatively short time constant, isolates the pulse generating circuitry from the high speed circuitry driven thereby, and permits the generation of sharp unipolar pulses having a duration of only a few nanoseconds.

Therefore among the objects of the present invention is the provision of a pulse-generating driver circuit of great simplicity and compactness and capable of providing pulses of a few nanoseconds duration at a rate of approximately 200 million pulses or more per second.

Another object is to provide a differentiating circuit having an extremely small time constant and providing substantial isolation between its input and output.

A further object of the invention is the provision of a high speed pulse generating circuit including a tunnel diode in combination with a differentiating circuit which may be gated on and off, the differentiating circuit utilizing the emitter impedance of a transistor in conjunction with a capacitor to produce fast, sharp pulses.

In the present invention these purposes (as well as others apparent herein) are achieved generally by providing a tunnel diode which is driven alternately between its two stable states of operation. In this manner rectangular pulses having leading and trailing edges whose rise and fall times may be on the order of tenths of a nanosecond are generated. These rectangular pulses are supplied to a differentiating capacitor which in turn is directly coupled to the emitter electrode of a transistor. In this manner unipolar voltage spikes corresponding in number to the rectangular pulses and having time-durations of a few nanoseconds are generated at the collector electrode of the transistor.

I have found that the unique circuitry just briefly described is particularly suited to drive high-speed electronic circuits such as binary counters. In fact the counting rate of a tunnel diode binary counter heretofore having a maximum counting rate of 100 mHz. (million cycles per second) may be more than doubled when driven by the circuitry of the present invention. In addition to providing unipolar voltage spikes having an extremely short time duration, the transistor employed in the circuit provides pulse amplification and serves to isolate the counting circuit from the pulse generating circuitry.

Utilization of the invention will become apparent to those skilled in the art from the disclosures made in the following description of a preferred embodiment of the invention as illustrated in the accompanying drawings, in which.

Figure 1:
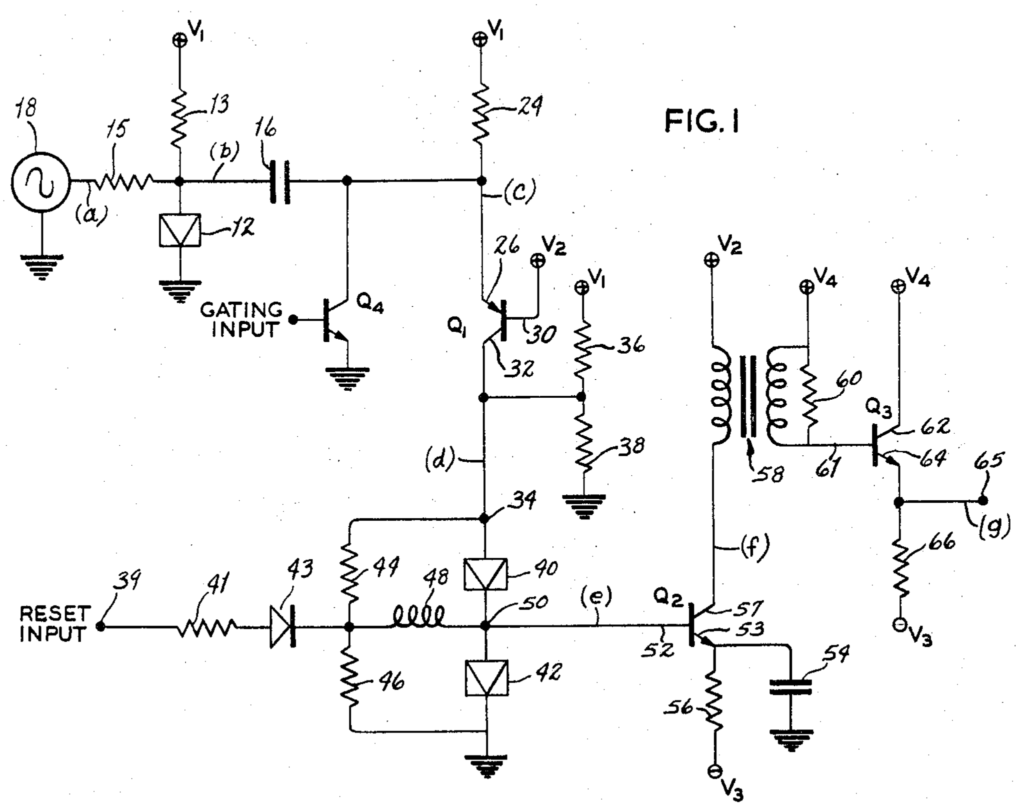
FIG. 1 is a schematic circuit diagram of the driver circuitry of the present invention, the driver circuitry being shown in combination with a tunnel diode binary counting circuit.

Referring now to the drawings, there is shown in FIG. 1 a combination binary counting and pulse generating driver circuit, generally designated 10. A tunnel diode 12 has its cathode electrode grounded and its anode electrode coupled through a differentiating capacitor 16 to the emitter electrode 26 of a PNP transistor $Q_1$.

A biasing resistor 13 and source of positive biasing potential, designated $+V_1$, furnish the appropriate biasing voltage to the anode of the tunnel diode 12.

For the high speed operation desired, the capacitor 16 preferably has a capacitance of from about 10 pf. to about 20 pf. and the effective impedance of the transistor $Q_1$ is from about 1 ohm to about 20 ohms.

Signal generator means, generally designated 18, has its output terminal connected to the anode of the tunnel diode 12 by means of a current-limiting resistor 15. The signal generator 18 may be one of several different types. As will be more fully described hereinafter, the generated signal (say sinusoidal) alternately drives the tunnel diode 12 between its two stable voltage states so that rectangular pulses having extremely fast leading and trailing edges are generated. In the illustrated embodiment, these leading and trailing edges have rise and fall times of approximately 0.35 nanosecond.

A resistor 24 couples the emitter electrode 26 of the transistor $Q_1$ to a source of positive voltage biasing potential, designated $+V_1$. The base electrode 30 of the transistor $Q_1$ is connected to a second positive voltage biasing source, designated $+V_2$, while the collector electrode 32 is connected to a common junction point 34.

The junction point 34 serves as an input terminal to a tunnel diode binary counting circuit and is connected to a point between resistors 36 and 38 which form a voltage divider between ground and the positive biasing source, $+V_1$. The binary counting circuit consists of two substantially identical and serially connected tunnel diodes 40 and 42, resistors 44 and 46, and an inductor 48. The anode of tunnel diode 40 is connected to the junction point 34 and its cathode is connected to the anode of tunnel diode 42 at point 50, which serves as the output terminal of the binary counting circuit. The cathode of the tunnel diode 42 is grounded. The resistor 44 is connected between the junction point 34 and the resistor 46, whose other end is connected to ground. The inductor 48 is connected between the connected-together ends of the resistors 44, 46 and the cathode-anode connection of the tunnel diodes 40 and 42. Also connected to the point common to resistors 44 and 46 is a pulse reset circuit which includes reset terminal 39, current-limiting resistor 41, and diode 43.

The output terminal 50 of the binary counting circuit is connected to the base electrode 52 of an NPN transistor $Q_2$, which in turn has its emitter electrode 53 coupled to ground by means of a differentiating capacitor 54. Also connected to the emitter electrode 53 is a resistor 56 which couples it to a negative voltage biasing source, $-V_3$. The collector electrode 57 of the transistor $Q_2$ is connected to the positive voltage biasing source $+V_2$ through the primary winding of a pulse coupling transformer 58. The secondary of the transformer 58 is connected across a resistor 60, whose one end is connected to a positive voltage biasing source $+V_4$ and whose other end is connected to the base electrode 61 of an NPN transistor $Q_3$. The collector electrode 62 of the transistor $Q_3$ is connected to the biasing source $+V_2$ and its emitter electrode 64 is conected in the well known emitter-follower fashion to the biasing source $-V_3$ through a load resistor 66. The output of the circuitry of FIG. 1 is taken from the emitter electrode of the transistor $Q_3$ at an output terminal designated 65.

Figure 2:
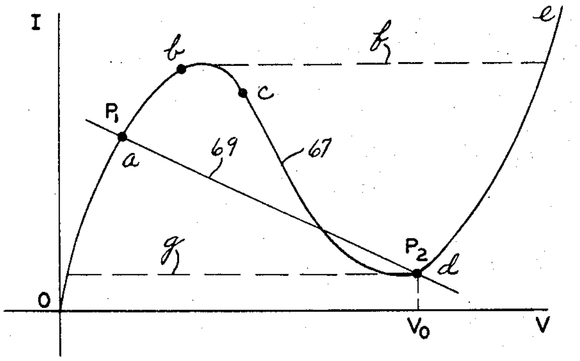
FIG. 2 is a co-ordinate plot of a typical voltage-current characteristic of a tunnel diode.

Before describing the operation of the circuitry 10 shown in FIG. 1, it may be well to briefly outline the essential operating and material characteristics of tunnel diodes in order to facilitate a clear understanding of the present invention. Conventional tunnel diodes consist of highly doped (impurity concentrations of the order of $10^{+19}$ net donor or acceptor atoms per cubic centimeter for germanium) semi-conductive PN junction diodes having extremely narrow junctions (on the order of 150 angstrom units or less). These devices were first described in an article by L. Esaki entitled "New Phenomenon in Narrow Germanium PN Junctions," appearing in the January 1957 issue of the Physical Review on pages 603–605. They are characterized by an N-shaped characteristic curve, as shown at 67 in the co-ordinate voltage-current plot of FIG. 2. As the voltage across the junction is increased from zero volts, the current rises steadily through a point *a* until it reaches the peak or threshold portion of the curve just beyond point *b*. It then decays rapidly along the negative resistance of the curve through point *c* and stabilizes in the high voltage-low current valley area at point *d*. A typical load line is represented in FIG. 2 by the line 69 passing through points *a* and *d*.

Consider first the operation of the binary counter portion of circuit 10. The biasing resistors 36, 38, 44 and 46 are chosen such that in the quiescent state the potential at the input junction terminal 34 is greater than the peak potential of either of the tunnel diodes 40 and 42, but less than twice such potential. In the embodiment illustrated, the tunnel diodes 40 and 42 are chosen to have substantially identical characteristics. That is, the high level voltage state for each is approximately 400 mv. and the low level voltage state for each is aproximately 70 mv. With these operating characteristics it has been found that a biasing voltage of 0.7 volt at input terminal 34 is appropriate to provide the bistable operation of the tunnel diodes 40, 42 now to be described.

Initially tunnel diode 40 is biased to its high voltage-low current state (point *d* on the characteristics curve) and the tunnel diode 42 is biased to its low voltage-high current state (point *a* on the characteristic curve). Thus with respect to ground potential, the output terminal 50 of the binary counter circuit is in the low level state as indicated by the wave form shown in FIG. 3(*e*).

Upon the application of a first positive current pulse or spike to the input terminal 34 of the binary counting circuit, the current through both of the tunnel diodes 40 and 42 increases. Considering tunnel diode 40 which is in the high voltage state, its current increases from point *d* on the characteristic curve of FIG. 2 along the positive-slope portion towards the point indicated as *e*. Simultaneously the current in tunnel diode 42 increases from the point *e* on the characteristic curve until it reaches the threshold or peak indicated at point *b*. There the voltage jumps to the positive slope portion of the characteristic curve as indicated by the dashed line *f* and begins to approach the point indicated *e*. After the positive voltage spike has terminated, the current in both of the tunnel diodes 40, 42 moves downward along the positive slope portion of the characteristic curve toward the high voltage-low current state indicated at point *d*. Since the biasing potential provided at input terminal 34 is insufficient to sustain both of the tunnel diodes in their high voltage states, tunnel diode 40 will tunnel along the dashed line indicated at *g* and switch to the stable, low voltage-high current state indicated at *a*. On the other hand tunnel diode 42 will reach the high voltage-low current state at point *d* and stabilize there until a second positive current spike is applied to the input terminal 34.

Figure 3:
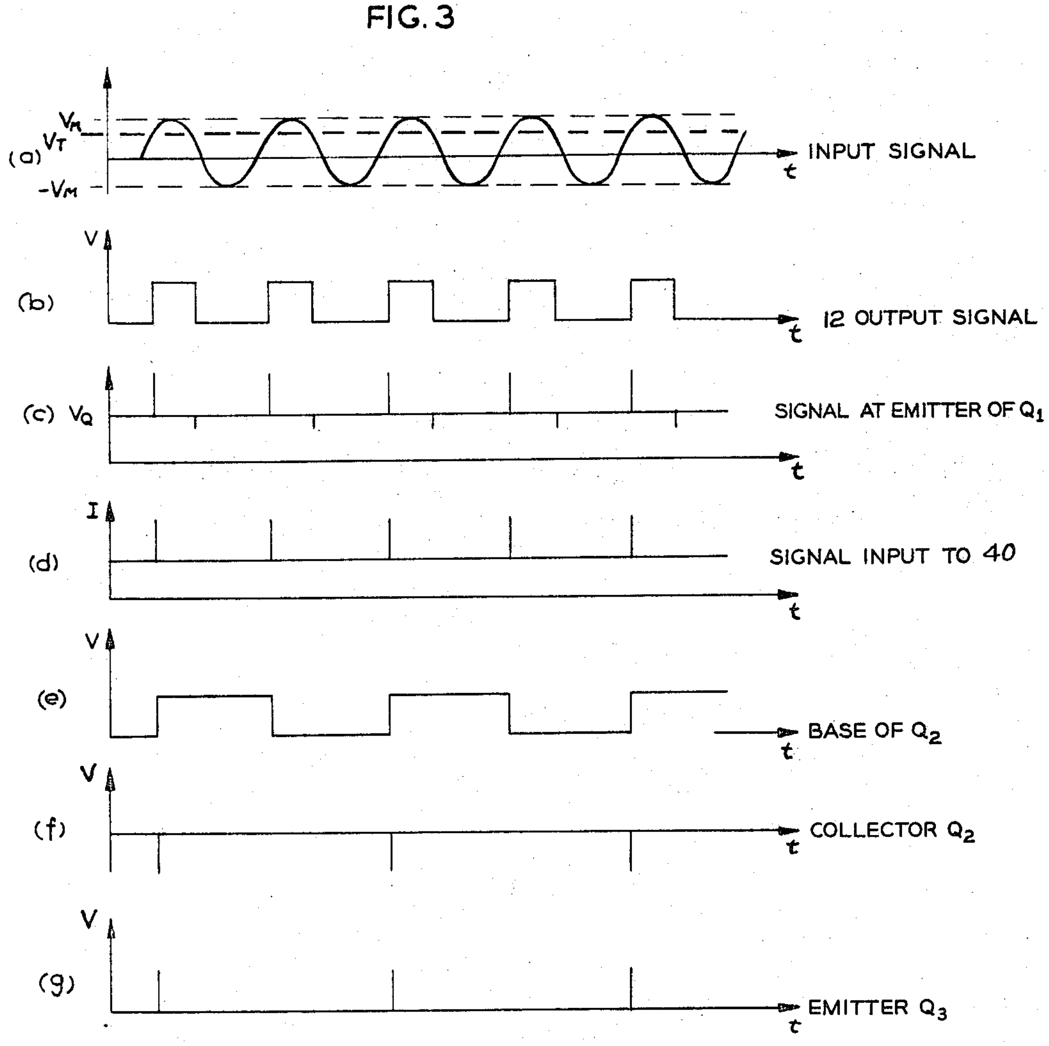
FIG. 3 is a sketch of the signal wave forms which occur at various points in the circuit of FIG. 1.

The sequence of operations just described results in a step-function rise of the potential at the output terminal 50 to a high voltage state as indicated at FIG. 3(*e*). The application of a second positive current spike to the input terminal 34 causes the tunnel diodes 40 and 42 to switch back to their initial states in a manner similar to that described hereinabove. It may be seen that this switching action of the tunnel diodes between their high voltage and low voltage states has resulted in the generation of one rectangular pulse at the output terminal 50 for each pair of current spikes applied to the input terminal 34, thus the binary counting. A further detailed description of such binary circuit operation may be found in the RCA Tunnel Diode Manual, page 44 Technical Manual TD–30, 1963.

Heretofore the type of binary counting circuit just described could be operated at an upper counting frequency of approximately 100 mHz. The driver circuitry of the present invention enables this binary counting circuit to more than double its upper limit counting frequency.

The operation of the driver circuitry is as follows: a sinusoidal signal is generated by the signal generator 18 and applied to the tunnel diode 12. As may be seen from FIG. 3(*b*) the tunnel diode so driven by the sinusoidal signal generates a sequence of rectangular pulses having a specified time duration and extremely fast leading and trailing edges. These rectangular pulses are coupled to the emitter electrode of the transistor $Q_1$ by the differentiating capacitor 16. The rectangular pulses are differentiated at their leading and trailing edges to produce the positive and negative voltage spikes as shown in FIG. 3(*c*). The differentiation action is provided by the capacitor 16 in combination with the effective impedance provided essentially by the emitter-base (particularly the diode junction) of the transistor $Q_1$. The leading, positive-going edge of a pulse causes the quiescent current flowing in the emitter-collector path to increase and then decrease at a rate determined by the time constant provided by the capacitor 16 and the effective impedance of the transistor $Q_1$. After returning to the quiescent state, the trailing edge then diverts a portion of the current from power supply $+V_1$ to the capacitor 16, producing a small signal change in the transistor current which may be considered to be negative with respect to the change caused by the leading edge of the pulse. Since transistor $Q_1$ provides diode-type action, only the positive current spikes appear at the collector electrode 32 as shown in FIG. 3(*d*).

The application of these positive current spikes to the input 34 of the binary counter circuit produces the rectangular pulses as shown in FIG. 3(*e*). As described hereinabove one rectangular pulse is generated for each pair of positive current spikes applied to the input terminal 34. These rectangular pulses are applied to the base 52 of the transistor $Q_2$. The differentiation action brought about by the impedance of the transistor $Q_1$ and the differentiating capacitor 54 provide negative voltage spikes at the collector 57 of the transistor $Q_2$, see FIG. 3(*f*). These pulses are inverted by the transformer 58 and applied to the base of the emitter-follower transistor $Q_3$. Positive voltage spikes appear at the output terminal of the circuit 10 as shown in FIG. 3(*g*). One pulse appears for each pair of pulses generated by the tunnel diode 12, the differentiating capacitor 12, and transistor $Q_2$.

As may be seen from FIG. 1, an NPN transistor $Q_4$ has its collector connected to the electrode 26 of transistor $Q_1$ and its emitter connected to ground potential. The base of transistor $Q_4$ serves as a gating input to the binary circuit 10. In normal operation the base is biased negatively with respect to ground potential so that the shunt path from emitter 26 of transistor $Q_2$ to ground is in essence an open circuit. However, when it is desired to interrupt the application of driving pulses from the differentiating portion of the circuit 10, a positive potential may be applied to the base of transistor $Q_4$ to gate the counting portion of the circuit.

Obviously, many modifications and variations of the present invention are possible in view of the above teachings. Therefore, it is to be understood that the invention may be practiced otherwise than as specifically described.

I claim:

1. For use in generating sharp, fast spikes for high speed electronic counters or the like, the driver circuitry comprising means for generating successively occurring pulses having leading and trailing edges, means electrically connected to said pulse generating means for differentiating said successively occurring pulses and providing voltage spikes coinciding in time with at least two edges of said generated pulses, said differentiating circuit means including a capacitor having one of its terminals connected to the emitter electrode of a common base transistor, the emitter-base path of the transistor providing an impedance such that a predetermined time constant is provided by it and said capacitor, the collector electrode of said transistor serving as an isolated output terminal for said spike generating circuit, and means connected to the emitter electrode of said transistor and to said pulse generating means for supplying electrical energy thereto, whereby unipolar voltage spikes coinciding with either the leading or trailing edge of said generated pulses are provided at said collector electrode of said transistor.

2. The circuitry as defined in claim 1, wherein said means for generating said successively occurring pulses, comprises a tunnel diode, and signal generating means electrically connected to said tunnel diode for driving said tunnel diode alternately from one stable state to another stable state.

3. The circuitry as defined in claim 1, wherein the value of said capacitor is in the range from about 10 picofarads to about 20 picofarads, and the value of said impadence of said transistor is in the range of from about 1 ohm to about 20 ohms.

4. The circuitry as defined in claim 1, further comprising means electrically connected to said emitter electrode of said transistor to selectively shunt it to ground, whereby to selectively actuate said differentiating circuit means.

5. A combination high speed binary counter and pulse driver circuit, comprising a tunnel diode for providing substantially rectangular pulses having fast leading and trailing edges, a differentiating capacitor having one terminal electrically coupled to said tunnel diode, a first transistor including a base, an emitter, and a collector, said first transistor having its base electrode connected to a reference potential and its emitter electrode connected to the other terminal of said capacitor, whereby the emitter-base path impedance of said first transistor together with said capacitor provides a predetermined short time constant thereby to generate unipolar voltage spikes corresponding in number to said rectangular pulses at said collector electrode, tunnel diode binary circuit means having its input electrically connected to said collector electrode of said transistor and providing at its output one substantially rectangular output pulse for every two voltage spikes applied to its said input, a second transistor having a base, an emitter, and a collector, the base electrode of said second transistor being connected to said output of said tunnel diode binary circuit means, said emitter electrode of said second transistor being coupled to a differentiating capacitor, whereby unipolar voltage spikes corresponding in number to said rectangular pulses appearing at said binary circuti means output are produced at said collector electrode of said second transistor, and means connected to apply bias and supply potential to said tunnel diode, said binary circuit means, and said first and second transistors.

References Cited

UNITED STATES PATENTS

| | | | |
|---|---|---|---|
| 3,171,979 | 3/1965 | Corsiglia | 307—268 |
| 3,215,948 | 11/1965 | Dalton | 307—286 |
| 3,226,575 | 12/1965 | Whittle | 307—268 |

JOHN S. HEYMAN, *Primary Examiner.*

U.S. Cl. X.R.

307—268, 288